United States Patent
Levy et al.

(10) Patent No.: US 6,473,301 B1
(45) Date of Patent: *Oct. 29, 2002

(54) DISK DRIVE TEST RACK WITH UNIVERSAL ELECTRICAL CONNECTOR

(75) Inventors: Lloyd E. Levy; Duc Banh, both of San Jose; Danilo Bueno, Millbrae, all of CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/973,570

(22) Filed: Oct. 9, 2001

Related U.S. Application Data

(63) Continuation of application No. 09/501,444, filed on Feb. 10, 2000.

(51) Int. Cl.[7] .................................................. G06F 1/16
(52) U.S. Cl. ........................ 361/685; 361/683; 361/684; 324/73.1; 439/79
(58) Field of Search ................................ 361/683–686, 361/724; 324/73.1, 158.1; 439/928.1, 959, 327, 680, 218, 79, 80

(56) References Cited

U.S. PATENT DOCUMENTS

| | | | |
|---|---|---|---|
| 5,812,821 A | 9/1998 | Sugi et al. ................... | 395/500 |
| 5,851,142 A | 12/1998 | Hamid .......................... | 454/57 |
| 5,865,642 A | 2/1999 | Rugg .......................... | 439/499 |
| 5,865,651 A | 2/1999 | Dague et al. ................ | 439/680 |
| 6,124,707 A | 9/2000 | Kim et al. ................ | 324/158.1 |
| 6,327,150 B1 * | 12/2001 | Levy et al. .................. | 361/724 |

OTHER PUBLICATIONS

U.S. patent application Ser. No. 09/501,444, Levy et al., filed Feb. 10, 2000.

* cited by examiner

*Primary Examiner*—Darren Schuberg
*Assistant Examiner*—Yean-Hsi Chang
(74) *Attorney, Agent, or Firm*—Marsh Fischmann & Breyfogle LLP

(57) ABSTRACT

A disk drive test device for performing a test (e.g., power only self test, tests which use a serial interface) on at least one disk drive at a time. The test device includes an electrical connector which is configured so as to be able to provide the necessary electrical interconnections for executing a test on disk drives having different types of drive interface connectors (i.e., the same electrical connector may be used with at least 2 different types of drive interface connectors). There is no need to use an in-line adapter to electrically interconnect a disk drive having a first drive interface connector or to electrically interconnect a disk drive having a second drive interface connector. There is also is no need to change out the electrical connector when performing a test on disk drives which use this different types of drive interface connectors.

21 Claims, 3 Drawing Sheets

DISK DRIVE TEST RACK WITH UNIVERSAL ELECTRICAL CONNECTOR

RELATED APPLICATIONS

This patent application claims priority from and is a continuation of U.S. patent application Ser. No. 09/501,444, that was filed on Feb. 10, 2000, that is entitled "DISK DRIVE TEST RACK WITH UNIVERSAL ELECTRICAL CONNECTOR," and the entire disclosure of which is incorporated by reference in its entirety herein.

FIELD OF THE INVENTION

The present invention generally relates to: the field of disk drives and, more particularly, to a disk drive test rack for performing certain disk drive tests (e.g., a power only self test) which utilizes an electrical connector which is configured to establish an appropriate interface (e.g., power) with disk drives having different types of drive interface connectors.

BACKGROUND OF THE INVENTION

Test racks for performing a power only self test on disk drives are well known Typically these test racks include an electrical connector for each disk drive storage area on the test rack. Known electrical connectors of this type are configured to work with only one type of drive interface connector for a disk drive. Therefore, in order to use the test rack for a disk drive having a different type of drive interface connector, an intermediate adapter of sorts is used which includes structure on one portion thereof for interfacing with one of the electrical connectors on the test rack and structure on another portion thereof for interfacing with the drive interface connector on a single disk drive (e.g., an in-line connector). One such "intermediate adapter" which has been used is an interposer card which has connectors on both sides. Typical interposer cards are rated for 500 cycles. There are a number of deficiencies associated with these interposer cards. One is that the interposer cards are discarded after being used 500 times which increases material costs. Another is that the number of times which an individual interposer card has been used must be monitored which also increases costs.

BRIEF SUMMARY OF THE INVENTION

The present invention is generally directed to a disk drive test rack. Typically these disk drive test racks accommodate the simultaneous testing of a plurality of disk drives. Any number of tests may be run on such disk drive test racks. Certain of these tests only require a limited number of interconnections with the disk drive, such as a power only self test and tests which use a serial interface. The present invention is specifically directed to such a disk drive test rack which allows for the performance of these types of tests, although the test rack could be used for running other types of tests on the disk drive(s) as well. More specifically, the present invention is directed to such a disk drive test rack which includes an electrical connector which provides the necessary electrical interconnections for executing certain types of tests on disk drives having different types of drive interface connectors. For instance, this electrical connector may be used for performing a test on a disk drive having a drive interface connector which is commonly referred to as a "single connector attachment" or "SCA" drive interface connector. This same electrical connector may also be used for performing a test on a disk drive having a drive interface connector which is commonly referred to as a "combo connector." Therefore, the present invention alleviates, the need to use an intermediate connector when using the same disk drive test rack for performing a test on disk drives which have different drive interface connectors.

A first aspect of the present invention is directed to a disk drive test rack. This disk drive test rack includes at least one disk drive storage bay, compartment, space or the like for receiving a disk drive. Each such disk drive storage bay includes an electrical connector having a plurality of electrical contact members or pins. These pins are arranged such that a first group of these pins (e.g., one or more pins) will provide an electrical interface for performing a test on a disk drive having a first type of drive interface connector (e.g., an "SCA" drive interface connector), and further such that a second group of these pins (e.g., one or more pins) will provide an electrical interface for performing a test on a disk drive having a second type of drive interface connector (e.g., "combo" drive interface connector) which is different from the noted first type of drive interface connector. That is, one combination of pins from the electrical connector are used for performing the test at issue on a disk drive having one type of drive interface connector, and a different combination of pins from the same electrical connector are used for performing the test at issue on a disk drive having a different type of drive interface connector.

Various refinements exist of the features noted in relation to the subject first aspect of the present invention. Further features may also be incorporated in the subject first aspect of the present invention as well. These refinements and additional features may exist individually or in any combination. At least some and more typically each of the pins of the electrical connector are pogo pins which are both compressable and expandable (e.g., spring-loaded) for movement along an at least substantially axial path. Using pogo pins for the electrical connector of the subject first aspect increases the number of cycles that such an electrical connector may be used, and thereby reduces the amount of maintenance. Another benefit of having the electrical connector include least one pogo pin in combination with the subject first aspect of the present invention is that at least one of these pogo pins may be used in performing the subject test on a disk drive having the first type of drive interface connector, and may be compressed against non-electrically-conducting structure of another disk drive having the second type of drive interface connector when performing the subject test thereon.

The electrical connector of the subject first aspect of the present invention has seven pins in one embodiment to allow the same connector to perform a power only self test on both a disk drive having the first type of drive interface connector and on another disk drive having the second, different type of drive interface connector, and without the need for using any type of in-line adapter in either of these cases. In the case of a disk drive having the first type of drive interface connector, the first and fourth pins of the electrical connector may provide power, the second and third pins of the electrical connector may provide a ground connection, the fifth pin of the electrical connector may interface with a disk drive status line (e.g., an LED), and the sixth and seventh pins may not even be electrically connected with the subject disk drive. However, when performing a power only self test on another disk drive having the second type of drive interface connector, the first and sixth pins of the electrical connector may provide power, the second pin of the electrical connector may provide a ground connection, the seventh pin of the electrical connector may interface with a disk drive status line (e.g., an LED), and the third, fourth and fifth pins may not even be electrically connected with the subject disk drive.

Although the same electrical connector of the test rack of the subject first invention directly interfaces with the disk drive having a first type of drive interface connector and a disk drive having a second, different type of drive interface connector, the requisite electrical interconnection in either or both cases actually need not be established through the drive interface connector of a particular disk drive. For instance, certain of the pins of the electrical connector may engage a corresponding number of pins on the drive interface connector of the first type. All electrical connections for executing the subject test in this case may be provided through the drive interface connector of this first type. This need not be the case when executing the subject test on a disk drive having a drive interface connector of the second type. In fact, in one embodiment none of the pins of the electrical connector need to establish electrical contact with any portion of the drive interface connector of the second type. All electrical connections for performing the subject test in this case instead may be realized by having certain of the pins of the electrical connector directly interface with corresponding lines of the printed circuit board of the disk drive to which the drive interface connector of the second type is attached.

A second aspect of the present invention is a method for executing a test for disk drives using a certain disk drive test rack. The method includes the steps of electrically interconnecting a first disk drive to the disk drive test rack using a certain electrical connector. This first disk drive has a first type of drive interface connector, and the electrical connector directly interfaces with the first disk drive (i.e., no intermediate connector or adapter is required or used). Thereafter a test is performed on the first disk drive. Upon completion of the test on this first disk drive, the first disk drive is electrically disconnected from the noted electrical connector on the test rack. The foregoing is repeated for a second disk drive which differs from the first disk drive at least by having a second type of drive interface connector (i.e., the first and second types of drive interface connectors are different, and yet there is no need for an intermediate connector or adapter in either case). Each of the various features noted above in relation to the first aspect of the present invention may be incorporated into the methodology of this second aspect of the present invention as well.

DETAILED DESCRIPTION OF THE INVENTION

Figure 1:
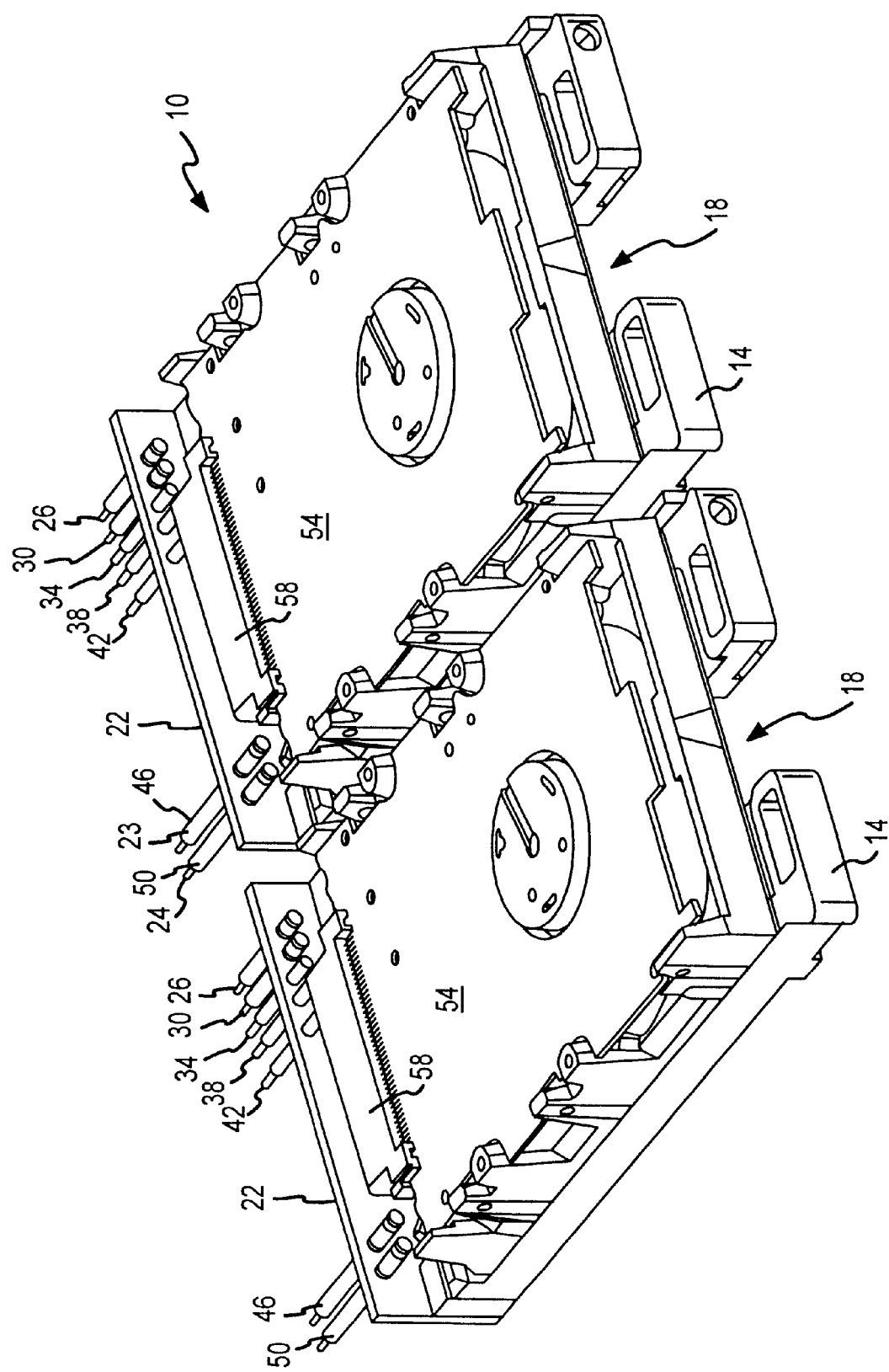
FIG. 1 is a perspective view of a portion of a disk drive test rack having a pair of disk drives loaded therein for execution of a power only self test.

The present invention will now be described in relation to the accompanying drawings which at least assist in illustrating its various pertinent features. FIG. 1 is a perspective view of one embodiment of a disk drive test device or rack 10. The disk drive test device 10 includes a pair of disk drive supports 14 which define a pair of disk drive compartments or bays 18. Any number of bays 18 may be used by the disk drive test device 10 (e.g., one or more bays 18). Each disk drive compartment 18 includes its own electrical connector 22. In one embodiment, the test rack 10 is used to execute a power only self test on a disk drive 54, and therefore hereafter the connector 22 may be referred to as a power only self-test connector 22. However, the connector 22 is also applicable for running other tests which require only a limited number of interconnections with the disk drive 54, such as through a serial interface. Some additional electrical connections may be required for the connector 22 for other tests of the noted type.

Appropriate contact between one of the power only self test electrical connectors 22 with a corresponding disk drive 54 allows for execution of a power only self test on such a disk drive 54. As is known in the art, the disk drive 54 itself includes the protocol for actually executing the power only self test, such as in the firmware of the disk drive 54. Therefore, the disk drive test device 10 may be used with any protocol and principally functions to provide power for a disk drive 54 undergoing a power only self test in accordance with the protocol of the particular disk drive 54, and further typically to provide a way to monitor the status of such a power only self test (e.g., via a light emitting diode). Although the disk drive test device 10 will hereafter be described in relation to the execution of power only self tests on the disk drives, it should be appreciated that other types of tests could be run on disk drives 54 using the same disk drive test rack 10 if desired/required.

As will be discussed in more detail below, the power only self test electrical connector 22 of the disk drive test device 10 is universal in the sense that it may be used to provide the necessary electrical connections for performing a power only self test on disk drives having different drive interface connectors and without requiring the use of an adapter or the like, and further without having to change the power only self test electrical connector 22 for a change in the type of drive interface connector. The power only self test electrical connector 22 may be used to provide power to a disk drive for a power only self test for at least two different types of drive interface connectors. These principles may be to utilized regardless of the configuration of the disk drive test device 10, and therefore the present invention is also not limited to the configuration of the disk drive test device 10 presented in FIG. 1.

The power only self test electrical connector 22 of FIG. 1 includes a plurality of pins for establishing an appropriate electrical interface or interconnection with disk drives for at least two different types of drive interface connectors. FIG. 1 illustrates that the power only self test electrical connector 22 includes a first pin 26, a second pin 30, a third pin 34, a fourth pin 38, a fifth pin 42, a sixth pin 46, and a seventh pin 50. Each of these pins 26, 30, 34, 38, 42, 46, and 50, are electrically interconnected with relevant structure of the disk drive test device 10 to provide a predetermined function for purposes of the subject power only self test. One combination of these pins 26, 30, 34, 38, 42, 46, and 50 (e.g., all or a subset thereof) provides the necessary electrical interconnections between the disk drive test device 10 and a disk drive having one type of drive interface connector for performance of a power only self test thereon. Another, different combination of the same pins 26, 30, 34, 38, 42, 46, and 50 (e.g., all or subset thereof) provides the necessary electrical interconnections between the disk drive test device 10 and a disk drive having a different type of drive interface connector for performance of a power only self test thereon.

Each of the pins 26, 30, 34, 38, 42, 46, and 50 are what is commonly referred to as a "pogo pin." As such, each such pin 26, 30, 34, 38, 42, 46, and 50 includes an outer member 23 and an inner member 24. In one embodiment, the outer member 23 remains stationary and its corresponding inner member 24 is spring loaded and is axially movable relative to the outer member 23. In this regard, one or more springs or other resilient members may bias its corresponding inner member 24 toward the subject disk drive. The ends of each of the inner members 24 of each pin 26, 30, 34, 38, 42, 46, and 50 may be a combination of flat tip and concave tip. At least one of the pins 26, 30; 34, 38, 42, 46, and 50 having a concave tip may be used to facilitate the proper alignment of at least one of those pins 26, 30, 34, 38, 42, 46, and 50 having a flat tip with the disk drive undergoing a power only self test in the disk drive test device 10.

Figure 2:
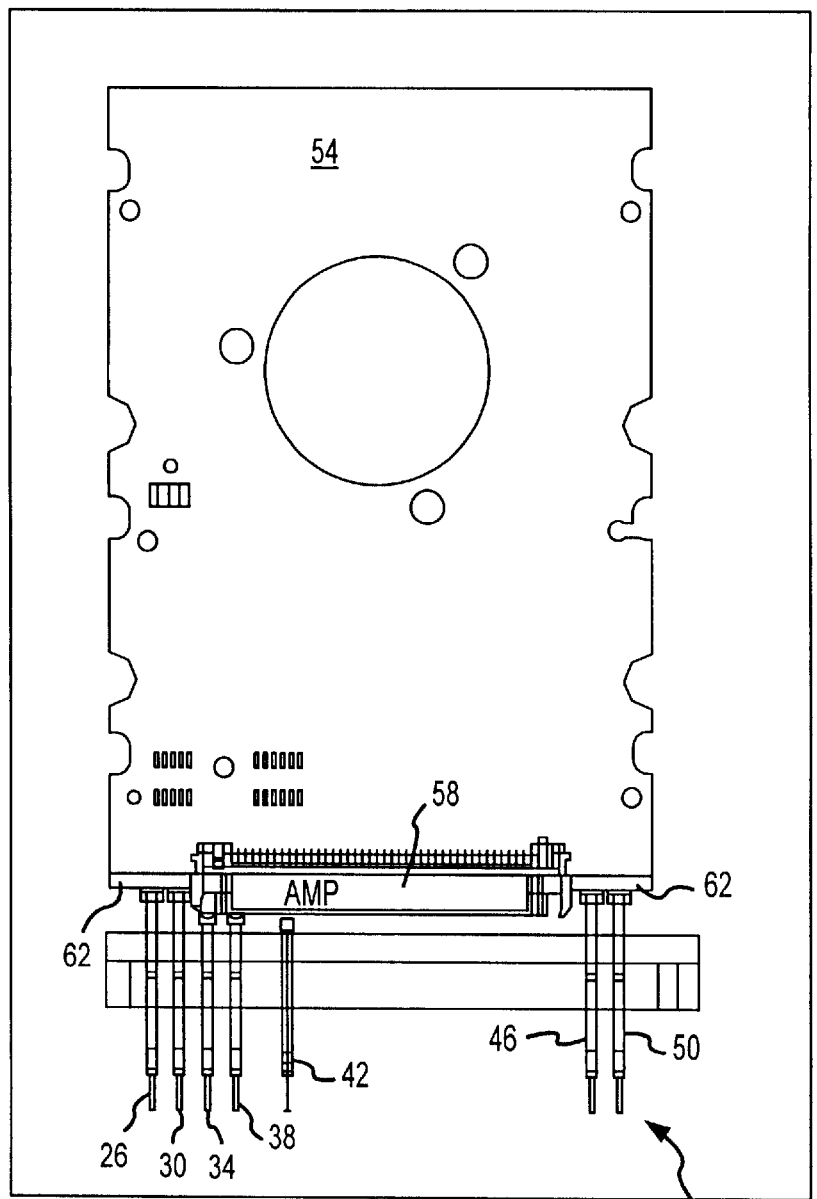
FIG. 2 is top view of an electrical connector used by the disk drive test rack of FIG. 1 on a disk drive having an SCA-type drive interface: connector.
Figure 3:
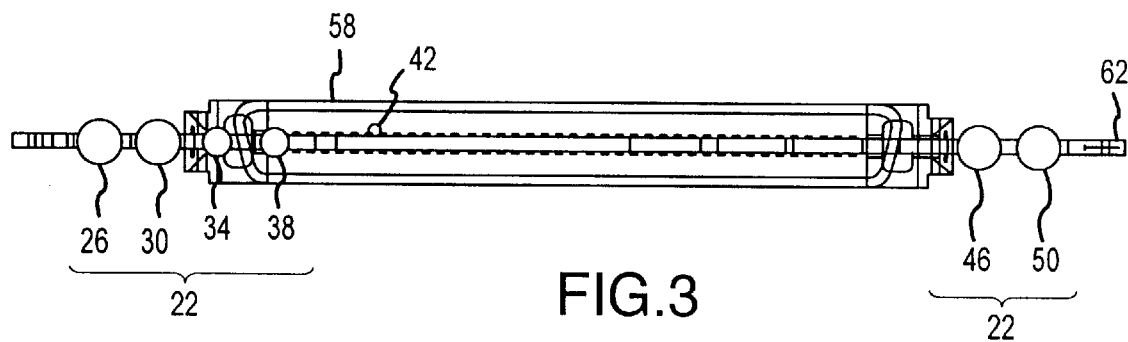
FIG. 3 is a cutaway end view of the interface between the electrical connector and disk drive of FIG. 2.

FIGS. 2-3 illustrate an electrical interconnection between the power only self test electrical connector 22 presented in FIG. 1 and one of the disk drives 54 also presented in FIG. 1. The disk drive 54 includes a drive interface connector 58 of a first type. Commonly the drive interface connector 58 is referred to as a single component attachment or SCA type drive interface, which is an 80 pin connector having a pair of vertically spaced rows of the least generally horizontally disposed metal tabs or the like (e.g., slide-type electrical contacts) which lead to the relevant line(s) on a printed circuit board 62 of the disk drive 54. No portion of the power only self test electrical connector 22 actually establishes direct electrical contact with any portion of the drive interface connector 58 itself. Instead, the power only self test electrical connector 22 establishes a direct electrical connection with the printed circuit board 62. In this regard, the first pin 26 of the connector 22 engages a formed contact or a remaining portion of what once was a via through the drive's 54 board 62 (a hole which has been cut in half and which has been appropriately plated) and provides power at +12V to the disk drive 54. The second pin 30 of the connector 22 engages a formed contact or a portion of a remaining portion of what once was a via through the printed circuit board 62 of the disk drive 54 and which has been appropriately plated, and provides a grounding function. The third pin 34, the fourth pin 38, and the fifth pin 42 of the connector 22 engage the drive interface connector 58, but not in an electrical interconnecting relationship. There is no electrical interconnection between any of the third pin 34, the fourth pin 38, and the fifth pin 42 of the power only self test connector 22 and the drive interface connector 58 of the disk drive 54. As such, the third pin 34, the fourth pin 38, and the fifth pin 42 of the connector 22 are compressed in a direction which is generally directed away from the disk drive 54.

Power at +5V is provided to the disk drive 54 by the disk drive test device 10 by the sixth pin 46 of the power only self test electrical connector 22 engaging a formed contact or a portion of a remaining portion of what once was a via through the printed circuit board 62 of the drive 54 and which has been appropriately plated. Finally, the status of the power only self test of the disk drive 54 is monitored by having the seventh pin 50 of the connector 22 engage a formed contact or a portion of a remaining portion of what once was a via through the printed circuit board 62 of the drive 54 and which has been appropriately plated. The seventh pin 50 is appropriately interconnected with an LED (not shown) associated with the disk drive test device 10.

With the electrical interface between the disk drive test device 10 and the disk drive 54 being established in the above-noted manner, power is provided by the disk drive test device 10 to the disk drive 54. A power only self test is then executed on the disk drive 54 by its firmware or the like. The status of this power only self test may be monitored through a light emitting diode which is associated with the disk drive test device 10 and which is electrically interconnected with the disk drive 54 through the seventh pin 50 of the power only self test electrical connector 22.

Figure 4:
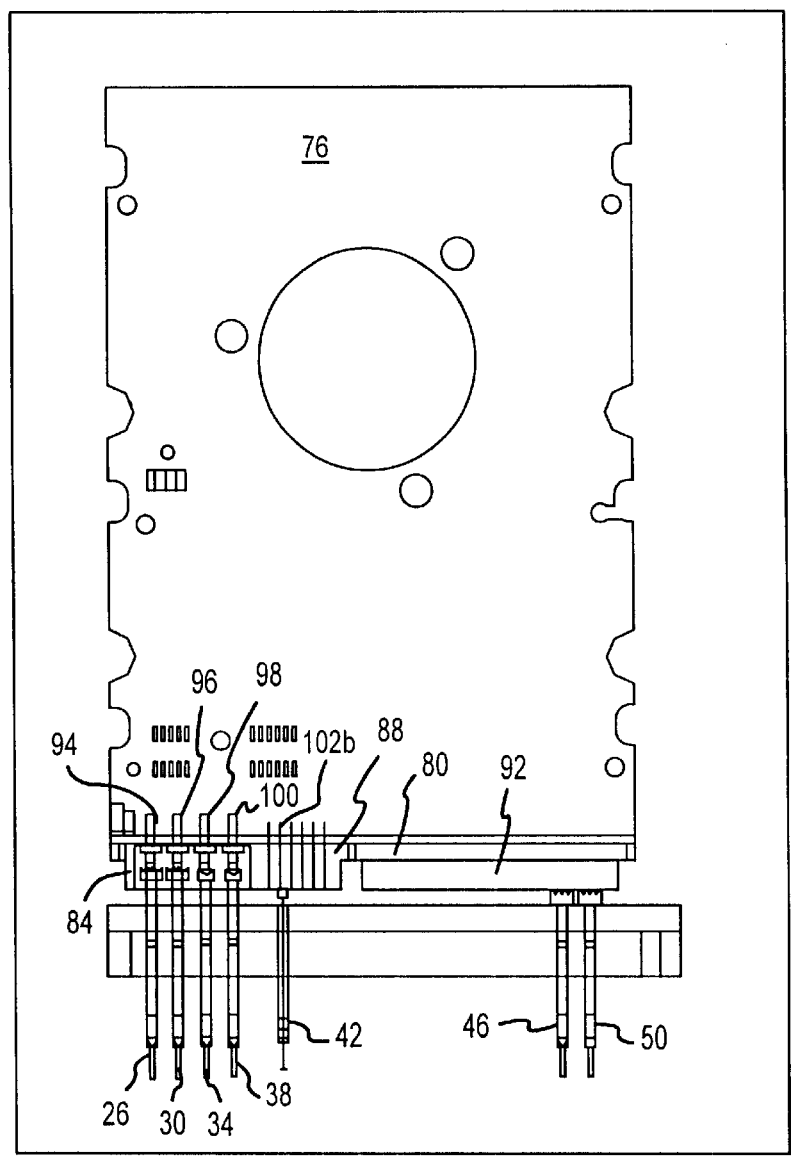
FIG. 4 is top view of the same electrical connector illustrated in FIGS. 2 and 3, but on a disk drive having a combination or combo-type drive interface connector.
Figure 5:
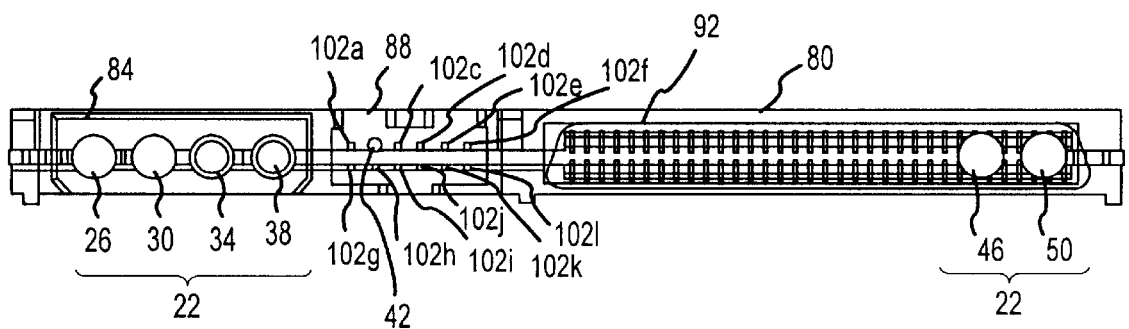
FIG. 5 is a cutaway end view of the interface between the electrical connector and the disk drive of FIG. 4.

FIGS. 4-5 illustrate an electrical interconnection between the same power only self test electrical connector 22 presented in FIG. 1 and a disk drive 76 which has a different drive interface connector than that used by the disk drive 54 of FIGS. 1-3. The disk drive 76 includes a drive interface connector 80 of what may be called a second type. Commonly the drive interface connector 80 is referred to as a combination or combo-type drive interface connector and which appropriately interfaces with a printed circuit board (not shown) of the disk drive 54. The drive interface connector 80 includes a power pin section or block 84. Included in this power pin block 84 is a +12 V pin 94 which provides power to the disk drive 76 at +12V, a first ground pin 96 and a second ground pin 98 which both provide a grounding function, and a +5V pin 100 which provides power to the disk drive 76 at +5V. Another portion of the drive interface connector 80 is a jumper pin section or block 88 which includes a plurality of jumper pins 102*a*-1. Finally, the drive interface connector 80 includes a data pin section or block 92 which is a conventional 68 pin D style data connection.

The power only self test electrical connector 22 establishes direct electrical contact with the drive interface connector 80 of the disk drive 76. In this regard, the first pin 26 of the connector 22 engages the +12V pin 94 of the drive interface connector 80 and provides power from the disk drive test device 10 to the disk drive 76 at +12V. The second pin 30 of the connector 22 engages the first ground pin 96 and provides an appropriate ground for the +12V power connection. Similarly, the third pin 34 of the connector 22 engages the second ground pin 98 of the drive interface connector 80 and provides an appropriate ground for the +5V power connection. The fourth pin 38 of the connector 22 engages the +5V pin 100 of the drive interface connector 80 and provides power from the disk drive test device 10 to the disk drive 76 at +5V. The fifth pin 42 of the connector 22 engages the jumper pin 102*b* of the drive interface connector 80 so as to allow the status of the power only self test of the disk drive 54 to be monitored. In this regard, the fifth pin 42 of the connector 22 is appropriately interconnected with an LED (not shown) associated with the disk drive test device 10. Finally, the sixth pin 46 and seventh pin 50 of the connector 22 engage the drive interface connector 80, but not in an electrical interconnecting relationship. There is no electrical interconnection between any of the sixth pin 46 and the seventh pin 50 of the power only self test connector 22 and the drive interface connector 80 of the disk drive 76. As such, the sixth pin 46 and seventh pin 50 of the connector 22 are compressed in a direction which is generally directed away from the disk drive 76.

With the electrical interface between the disk drive test device 10 and the disk drive 76 being established in the above-noted manner, power is provided by the disk drive test device 10 to the disk drive 76. A power only self test is then executed on the disk drive 76 by its firmware or the like. The status of this power only self test may be monitored through a light emitting diode which is associated with the disk drive test device 10 and which is electrically interconnected with the disk drive 76 through the fifth pin 42 of the power only self test electrical connector 22.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A disk drive test rack, comprising:
   at least one disk drive storage bay, wherein each said disk drive storage bay comprises an electrical connector, wherein each said electrical connector comprises a plurality of pins, wherein a first group of said pins provide an electrical interface for performing a test on a disk drive having a first type of drive interface connector, wherein a second group of said pins provide an electrical interface for performing a test on a disk drive having a second type of drive interface connector, wherein said first type is structurally different from said second type, wherein said at least one disk drive storage bay comprises first and second disk drive storage bays, wherein said test rack further comprises a first disk drive disposed in said first disk drive storage bay and a second disk drive disposed in said second disk drive storage bay, wherein said first disk drive has said first type of drive interface connector, and wherein said second disk drive has said second type of drive interface connector.

2. A disk drive test rack, as claimed in claim 1, wherein: said electrical connector alleviates a need for an adapter when using said disk drive test rack for executing a test on said disk drive having said first type of said drive interface connector, and thereafter using said disk drive test rack for executing a test on said disk drive having said second type of said drive interface connector.

3. A disk drive test rack, as claimed in claim 1, wherein: said first type of said drive interface connector type is a single connector attachment and said second type of said drive interface connector type is a combo connector.

4. A disk drive test rack, as claimed in claim 3, wherein: said combo connector comprises a power supply section, a separate jumper section, and a separate data transfer section.

5. A disk drive test rack, as claimed in claim 1, wherein: each of said plurality of pins comprises a pogo pin.

6. A disk drive test rack, as claimed in claim 1, wherein: said plurality of pins equals 7 said pins.

7. A disk drive test rack, as claimed in claim 1, wherein: said plurality of pins comprises a first pin, a second pin, a third pin, a fourth pin, a fifth pin, a sixth pin, and a seventh pin, wherein for said first type of said drive interface connector said first pin and said fourth pin interface are each in electrical contact with at least one power line associated with said first type of said drive interface connector, said second and third pins are in electrical contact with at least one ground line associated with said first type of said drive interface connector, said fifth pin is in electrical contact with a disk drive status line associated with said first type of said drive interface connector, and said sixth and seventh pins fail to establish electrical contract with any portion of said first type of said drive interface connector, and wherein for said second type of said drive interface connector said first pin and said sixth pin are each in electrical contact with at least one power line associated with said second type of said drive interface connector, said second pin is in electrical contact with a ground line associated with said second type of said drive interface connector, said seventh pin is in electrical contact with a disk drive status line associated with said second type of said drive interface connector, and said third, fourth, and fifth pins fail to establish electrical contact with any portion of said second type of said drive interface connector.

8. A disk drive test rack, as claimed in claim 1, wherein: said electrical connector electrically interfaces directly with a printed circuit board of said disk drive having said second type of said drive interface connector, and not directly with any electrically conducting pin of said second type of said drive interface connector.

9. A disk drive test rack, as claimed in claim 8, wherein: said electrical connector electrically interfaces directly with said first type of said drive interface connector.

10. A disk drive test rack, as claimed in claim 1, wherein: said first group of pins comprises at least one said pin and said second group of pins comprises at least one said pin.

11. A disk drive test rack, comprising:
    a disk drive storage bay, wherein said disk drive storage bay comprises an electrical connector, wherein said electrical connector comprises first means for establishing an electrical interconnection with a first disk drive having a first type of drive interface connector when said first disk drive is disposed in said disk drive storage bay, wherein said electrical connector further comprises second means for establishing an electrical interconnection with a second disk drive having a second type of drive interface connector when said second disk drive is disposed in said disk drive storage bay versus said first drive, wherein said first type is structurally different from said second type.

12. A disk drive test rack, as claimed in claim 11, wherein: said electrical connector alleviates a need for an adapter when using said disk drive test rack for executing a test on said first disk drive, and thereafter using said disk drive test rack for executing a test on said second disk drive.

13. A disk drive test rack, as claimed in claim 11, wherein: said first type of said drive interface connector is a single connector attachment and said second type of said drive interface connector is a combo connector.

14. A disk drive test rack, as claimed in claim 13, wherein: said combo connector comprises a power supply section, a separate jumper section, and a separate data transfer section.

15. A disk drive test rack, as claimed in claim 11, wherein: said electrical connector comprises a plurality of pins, wherein said first means comprises a first group of said plurality of pins, and wherein said second means comprises a second group of said plurality of pins that is different from said first type.

16. A disk drive test rack, as claimed in claim 15, wherein: each of said plurality of pins comprises a pogo pin.

17. A disk drive test rack, as claimed in claim 15, wherein: said plurality of pins equals 7 said pins.

18. A disk drive test rack, as claimed in claim 15, wherein: said plurality of pins comprises a first pin, a second pin, a third pin, a fourth pin, a fifth pin, a sixth pin, and a seventh pin, wherein for said first type of said drive interface connector said first pin and said fourth pin interface are each in electrical contact with at least one power line associated with said first type of said drive interface connector, said second and third pins are in electrical contact with at least one ground line associated with said first type of said drive interface connector, said fifth pin is in electrical contact with a disk drive status line associated with said first type of said drive interface connector, and said sixth and seventh pins fail to establish electrical contact with any portion of said first type of said drive interface connector, and wherein for said second type of said drive interface connector said first pin and said sixth pin are each in electrical contact with at least one power line associated with said second type of said drive interface connector, said second pin is in electrical contact with a ground line associated with said second type of said drive interface connector, said seventh pin is in electrical contact with a disk drive status line associated with said second type of said drive interface connector, and said third, fourth, and fifth pins fail to establish electrical contact with any portion of said second type of said drive interface connector.

19. A disk drive test rack, as claimed in claim 15, wherein: said first group of pins comprises at least one said pin and said second group of pins comprises at least one said pin.

20. A disk drive test rack, as claimed in claim 11, wherein: said electrical connector electrically interfaces directly with a printed circuit board of said second disk drive having said second type of said drive interface connector, and not directly with any electrically conducting pin of said second type of said drive interface connector.

21. A disk drive test rack, as claimed in claim 20, wherein: said electrical connector electrically interfaces directly with said first type of said drive interface connector of said first disk drive.

* * * * *